March 30, 1954 T. B. GIBBS ET AL 2,673,461
HAIRSPRING VIBRATING APPARATUS
Filed May 2, 1949 3 Sheets-Sheet 1

INVENTORS
THOMAS B. GIBBS
PARKER B. WICKHAM
BY R. S. Richardson
ATT'Y

INVENTORS
THOMAS B. GIBBS
PARKER B. WICKHAM

Patented Mar. 30, 1954

2,673,461

UNITED STATES PATENT OFFICE 2,673,461

HAIRSPRING VIBRATING APPARATUS

Thomas B. Gibbs, Delavan, and Parker B. Wickham, Janesville, Wis., assignors to Gibbs Manufacturing and Research Corporation, Janesville, Wis., a corporation of Wisconsin Application May 2, 1949, Serial No. 90,914

33 Claims. (Cl. 73—6)

The present invention relates in general to timing apparatus for clocks and watches and more in particular to apparatus for timing and regulating the rate of the balance wheel and hairspring assembly of a clock or watch before it is assembled with the rest of the movement. It is the common practice in the art to regulate the rate of a balance wheel by adjusting the length of the associated hair-spring while the balance wheel is oscillating or vibrating and the operation is generally referred to as hairspring vibrating.

The object of the invention may be described as a new and improved hairspring vibrating apparatus.

A feature of the invention is a novel stand for supporting a balance wheel to be regulated, and means included therein for generating periodic electrical currents responsive to oscillation of the balance wheel.

Another feature of the invention is a new arrangement for checking the rate of a balance wheel undergoing test. The frequency of the balance wheel output is not compared with a standard frequency as has been the practice heretofore, but the wheel output is used to produce a test voltage having a value which depends on the rate of the wheel. This test voltage is compared with a standard voltage to determine if the wheel is fast or slow.

A further feature is an arrangement for automatically repeatedly comparing the test voltage produced by an oscillating wheel with a voltage which is standard for such wheel and for automatically adjusting the hairspring each time in accordance with the result of the comparison.

The foregoing and other features will be described more in detail in the ensuing specification, reference being had to the accompanying drawings, in which—

Figures 1, 3, 4, 5:
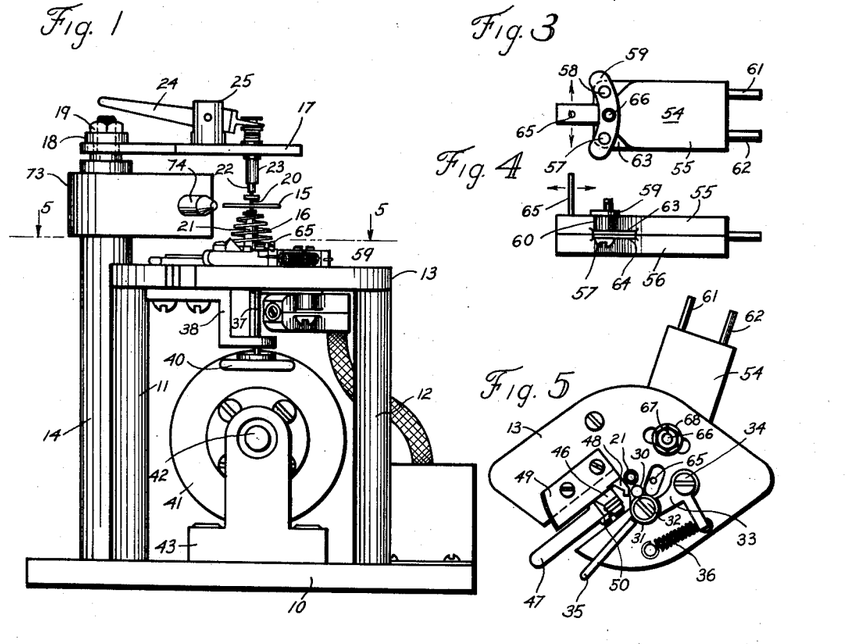
Fig. 1 is a front view of the hairspring vibrating stand constructed in accordance with the invention, said stand having a balance wheel supported thereon in readiness for testing and regulation.
Fig. 3 is a top view of the crystal pick up device, or microphone, detached from the stand.
Fig. 4 is a side view of the crystal microphone.
Fig. 5 is a partial section through the stand on the line 5—5, Fig. 1.

Referring to the drawings, the vibrating stand comprises a base 10, Fig. 1, two vertical pillars or posts 11 and 12, and a frame plate 13 which is supported by said pillars a short distance above the base 10. Another post 14 is located slightly to the left and rear of post 11 and supports a horizontal arm 17 which extends forward and to the right above the frame plate 13. The arm 17 may be removably secured to the upper end of post 14 by means of the nut 19 and washer 18. These parts may be made of brass or other suitable material.

A balance wheel is indicated at 15 and the associated hairspring at 16. The balance wheel has an arbor 20, the lower pivot of which has a bearing in the stud 21 which is fixed to and projects upward from the frame plate 13. The upper pivot of arbor 20 has a bearing in the rod or shaft 22, which is slidable vertically in the sleeve 23 on which it is supported. The sleeve 23 is supported on arm 17 as shown. Also supported on arm 17 is the bifurcated post 25 on which the lever 24 is pivotally mounted. This lever has a fork at the right hand end which cooperates with the sides of an annular groove at the upper end of shaft 22 so that the shaft may be moved longitudinally up or down by means of the lever.

It will be understood that balance wheels such as 15 can be readily inserted in or removed from the stand after depressing the lever 24 to raise the shaft 22.

One end of the hairspring 16 is attached to the arbor 20 of the balance wheel. The other end is clamped between two rollers 30 and 31. The roller 30 is formed at the upper end of a shaft 37 which has bearings in the frame plate 13 and the bracket 38, the latter being secured to the underside of the frame plate by means of screws. The roller 31 is mounted on the lever 33 by means of a shoulder screw 32 and the lever is pivotally mounted on the top of the frame plate 13 by means of another shoulder screw 34. The spring 36 tends to rotate the lever 33 about its pivot at 34 and thus keeps the roller 31 pressed against the roller 30. The roller 30 is provided with an annular groove of the proper width to receive the end of a hairspring such as 16 and the edge of roller 31 extends into the groove. When a hairspring is to be inserted between the rollers or removed therefrom the roller 31 may be moved away from roller 30 by means of the extension 35 of the lever 33.

Figure 7:
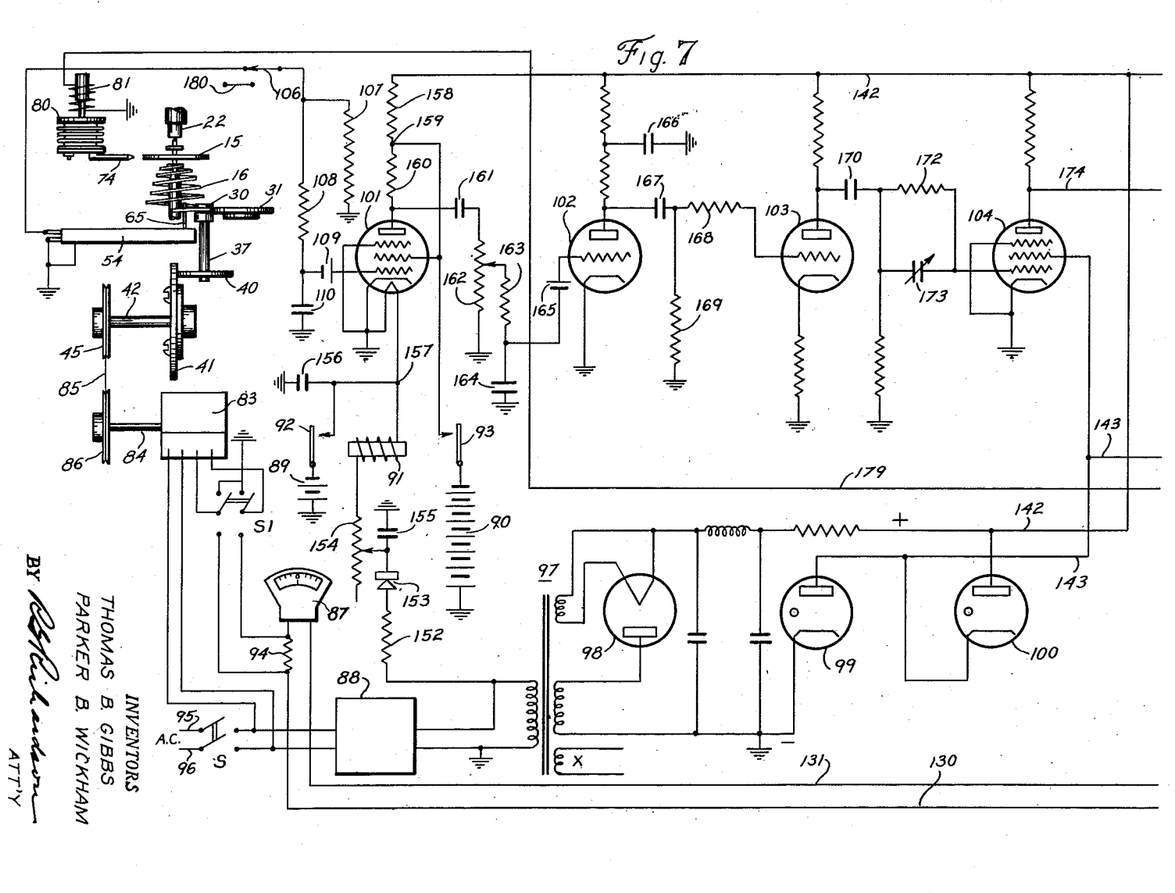
Figs. 7 and 8 are diagrammatic circuit drawings of the equipment involved in a complete installation.

Roller 30 may be rotated to adjust the length of a hairspring clamped between the rollers. The rotation is accomplished by means of a wheel 40 on shaft 37. This wheel can be manually rotated by the operator when inserting a hairspring, but during the automatic adjustment of the hairspring it is rotated by means of the wheel 41 with which it is in frictional engagement. Wheel 41 is mounted on a shaft 42 supported in bearings 43 and 44 and rotatable in either direction by means of the pulley 45. The belt drive including pulley 45 is shown in Fig. 7 and will be explained shortly. That part of wheel 41 which is engaged by wheel 40 is preferably made of resilient material such as rubber.

After adjustment, the hairspring is marked and cutoff by means of the marking and cutting die 46 in cooperation with the anvil 48. The anvil 48 may be formed integrally with the supporting member 49 which rests on the frame plate 13 and is secured thereto by means of screws as shown. The member 49 has a downwardly extending flange on which the die 46 is pivotally supported by the shoulder screw 50. The die is operated by the handle 47 which extends forward and to the left beyond the frame plate 13.

The reference character 54 indicates a crystal microphone which may be of known construction and hence need not be described in detail. It will suffice to say that the crystal is suitably mounted in a casing comprising the two halves 55 and 56 which are clamped together and secured to the curved bracket 59 by means of the screws 57 and 58 and two tubular spacers such as 60. The screw 57 passes through ears 64 and 63 on the casing, the spacer 60, and is threaded into the bracket 59. The arrangement on the other side including screw 58 is the same.

The means for mounting the crystal inside the casing 55—56 includes a frame having the pin 65 attached thereto and extending outside the casing. The arrangement is such that forces applied to pin 65 in the direction of the arrows in Fig. 3 affect the crystal by bending or twisting it mechanically whereas forces having the direction of the arrows in Fig. 4 do not. Thus only such forces as have a component in a direction which is perpendicular to the longitudinal axis of the microphone produce an electrical output.

The microphone 54 is mounted on the lower side of the frame plate 13 by means of the threaded stud 66 which may be welded or otherwise secured to bracket 59. This stud extends up through a slot in frame plate 13 above which there is a washer 68 and a nut 67 threaded on the stud whereby the parts are secured. The pin 65 extends up through another slot in the frame plate 13 far enough to be engaged by the lower coil of a hairspring clamped between the rollers 30 and 31.

Figure 6:
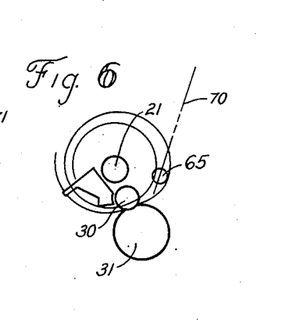
Fig. 6 is a diagrammatic drawing showing the relation between the hairspring adjusting rollers, a hair spring clamped between said rollers, and the actuating pin of the crystal microphone.

The arrangement for mounting the microphone 54 enables it to be adjusted relative to the other parts on the stand. There are two adjustments which are of importance in the operation of the device. The first of these adjustments has to do with the distance between the pin 65 and the balance wheel lower bearing stud 21, Fig. 6, which should be so regulated that it is slightly greater than the normal radius of the lower coil of the hairspring at that point, whereby the hairspring will continuously engage the pin and will not break contact with the pin as it expands and contracts periodically responsive to oscillation of the balance wheel. The second adjustment is concerned with the angular orientation of the microphone about the pin 65 which should be such that the pull on pin 65 caused by hairspring feed does not produce any electrical output from the microphone. In this connection it may be explained that when the roller 30 is rotated to shorten the hairspring, for example, the lower coil is in sliding engagement with the pin and the friction between the hairspring and the pin produces a small force acting on the pin in the direction of a line which is tangent to the circumference of the pin at the point where it is engaged by the hairspring. The desired result is secured by adjusting the microphone so that its longitudinal axis, indicated by the dotted line 70 in Fig. 6, is parallel to the above mentioned tangent line.

The two terminals 61 and 62 of the microphone are extended to a small junction box 71 by means of a shielded two conductor cord 72. One terminal may be grounded to the frame of the stand, while the other is extended preferably by a shielded conductor to the first stage of the amplifier shown in Fig. 7.

The bracket 73 is secured to post 14 near the top thereof and affords means for supporting the tube 74 through which impulses of air are supplied to drive the balance wheel. The means for generating the air impulses is shown in Fig. 7.

Figure 8:
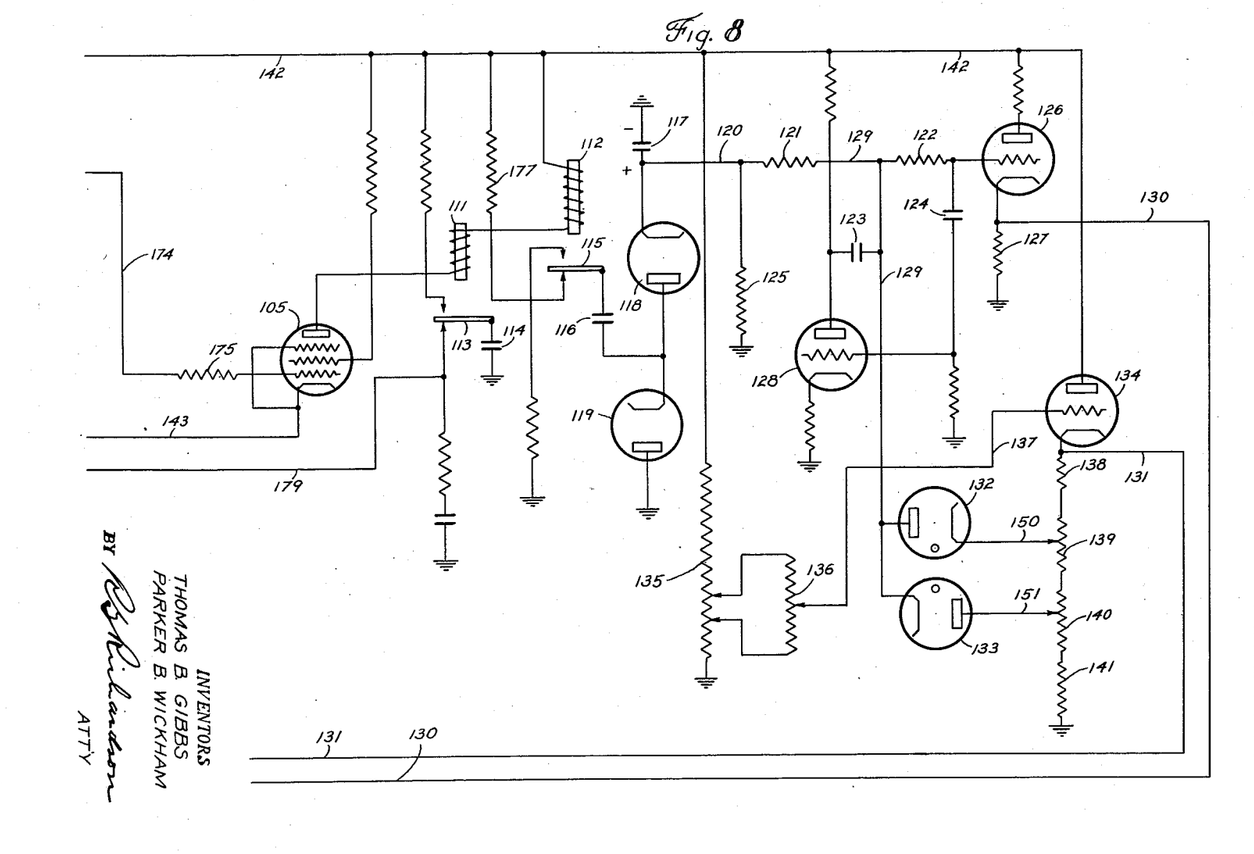

Referring now to Figs. 7 and 8, certain of the parts hereinbefore described are shown diagrammatically, these parts including the balance wheel 15 and hairspring 16, rollers 30 and 31, and the means for driving the roller 30. Also shown is the air impulse generator comprising a pump in the form of a Sylphon or bellows 80, adapted to be operated by the solenoid 81. This pump may be of known construction and hence is not shown in detail.

The reference numeral 83 indicates a recording galvanometer of the type sold by Leeds and Northrup under the trade-mark "Micromax" and shown in the patent to Squibbs, No. 1,935,732. This instrument comprises a sensitive galvanometer, means for periodically clamping the needle of the galvanometer in any deflected position, means for testing for the position of the needle, and means for rotating the shaft 84 and pulley 86 an amount which is proportionate to the amount by which the needle is deflected from its neutral or zero position. The direction of rotation is clockwise or counterclockwise depending on whether the needle is deflected to the right or left. In the instrument as sold by Leeds and Northup the pulley 86 is used to position a recording pen with reference to a moving chart by means of a belt or cord such as 85, but for the purpose of the present invention the recording pen and chart are discarded and the pulley 86 and cord or belt 85 are used to rotate the pulley 45 and shaft 42 on the vibrating stand. This takes place responsive to testing of a balance wheel on the stand and provides for automatically adjusting the length of the hairspring, as will be described in detail later on.

The output of the microphone 54 is substantially a sine wave and when testing 5 beat balance wheels it has a frequency of 2½ cycles per second.

The microphone output is transmitted to a five stage amplifier comprising tubes 101 to 104, inclusive, Fig. 7, and tube 105, Fig. 8, which may be of any known and suitable type. The operation of the amplifier will be described in more detail later on but it may be stated at this point that the first four stages not only operate as amplifier stages but function to convert the sine wave received from the microphone to a flat topped or square wave. The last stage is a power stage and its output is used to operate the relays 111 and 112 in synchronism with the balance wheel being tested. These relays are preferably mercury contact relays such as the 275C relay manufactured by the Western Electric Company.

Relay 111 controls the solenoid 81 to operate the air pump 80, Fig. 1, to drive the balance wheel.

Relay 112 operates an arrangement comprising the condensers 116 and 117 and rectifier tubes 118 and 119 to maintain a positive potential on conductor 120 which depends on the rate of the balance wheel, or the frequency of the output of the microphone 54. The output frequency is 2½ cycles per second for a 5 beat balance wheel, as already mentioned, if the rate of the wheel is correct, but will be higher or lower if the wheel is fast or slow and the voltage on conductor 120 varies accordingly.

Instead of the two rectifier tubes 118 and 119 which are shown, a type 6AL5 twin diode may be used.

The tube 126 may be any suitable triode and operates as a cathode follower to maintain a potential on the conductor 130 which is proportionate to the potential on conductor 120. The tube 128 operates as a ripple eliminator to smooth out the 2½ cycle ripple at the grid of tube 126 and on conductor 129, as will be described more in detail later on.

The reference character 136 indicates a potentiometer which may be adjusted to apply a voltage to conductor 137 and to the grid of tube 134 which is standard for the balance wheels being tested. The tube 134 operates as a cathode follower to maintain a potential on the conductor 131 which is proportionate to the standard voltage.

The tubes 132 and 133 are provided in order to limit the difference in potential which may exist between the conductors 130 and 131, for reasons which will be explained. They may be replaced by a type 6AL5 twin diode.

The conductors 130 and 131 extend to the instrument indicated at 87, Fig. 7, which may be a microammeter with a center zero scale. The resistor 94 is in series with the microammeter 87 and is a shunt damping resistor for the galvanometer 83. A switch S1 provides for connecting the galvanometer in parallel with the resistor 94 and in series with the microammeter 87.

The conductors 95 and 96 are connected to any convenient source of 60 cycle commercial alternating current. The switch S is the main switch through which alternating current is supplied to the motor in the galvanometer apparatus 83 and to the rectifier which includes the transformer 97, half wave rectifier tube 98, and the associated filtering impedances and condensers. The reference character 88 indicates a voltage regulator which is inserted in the line extending to the primary winding of the transformer 97 and which may be of the type manufactured by the Solar Electric Co. of Chicago, Illinois.

The tubes 99 and 100 may be type OA2 voltage regulator tubes and are connected in series across the output of the rectifier. The output voltage of the rectifier is preferably 300 volts, that is, the plus B conductor 142 is 300 volts positive with respect to ground. The voltage regulator tubes not only serve to maintain the voltage on conductor 142 at a constant value but they also provide for maintaining the conductor 143 at a potential of 150 volts positive with respect to ground. The conductors 142 and 143 supply anode and screen voltages to various tubes shown in Figs. 7 and 8.

The amplifications of the weak 2½ cycle alternating current output of the microphone 54 is a difficult problem and requires among other things the provision of special filtering arrangements at the first stage. These arrangements include the relay 91 and the batteries 89 and 90, which may be dry cell batteries having voltages of 4.5 and 90 volts, respectively.

Relay 91 is included in the cathode heater circuit for tube 101, which is in parallel with the primary winding of transformer 97. The winding X of the transformer supplies heater current to the other tubes.

The operation of the equipment will now be explained, reference being had to Figs. 7 and 8.

Upon closure of the main switch S, alternating current is supplied to certain parts of the equipment with results that will be described at this point insofar as is necessary or convenient.

To start with, consideration will be given to certain circuits in Fig. 8 that are activated as soon as current is supplied to the rectifier, Fig. 7, and voltage appears on the plus B conductor 142. The first of these circuits extends from ground through the resistor 135 to conductor 142. The potentiometer 136 is shunted around a part of resistor 135 and the resistance values are so selected that the voltages at the lower and upper ends of the potentiometer are about 25 and 35 volts, respectively, in the particular apparatus shown and described.

The potentiometer 136 is used for adjusting the standard voltage on conductor 137, or for changing such standard voltage to adapt the apparatus to the testing of balance wheels having different beat frequencies, as will be explained further on. For the present it will be sufficient to point out that a positive potential is applied over conductor 137 to the grid of tube 134, so that current flows in a circuit which extends from ground by way of resistor 141, potentiometer 140, potentiometer 139, resistor 138, and tube 134 to plus B conductor 142. The resistors 138 and 141 may have resistances of 5 M and 25 M ohms, tentiometers 140 and 139, resistor 138, and tube have resistances of 5 M and 15 M ohms, respectively, and may be so adjusted that the potential on conductor 150 is about 31 volts while the potential on conductor 151 is about 29 volts. These are approximate values which obtain when the apparatus is adjusted for testing 5 beat balance wheels and are given merely by way of example.

A circuit may now be traced which extends from ground by way of the resistor 125, resistor 121, conductor 129, tube 133, conductor 151, potentiometers 140 and 139, resistor 138, and tube 134 to conductor 142. The resistors 125 and 121 preferably have values on the order of 2.5 megohms and 1 megohm, respectively, and since the resistance of the rest of the circuit is relatively low, the current which flows does not greatly affect the potential on conductor 151. It may be noted particularly that due to the very low resistance of tube 133 the potential on conductor 129 is only slightly less than that on conductor 151. The condenser 117 is in parallel with the resistor 125 in the above traced circuit and changes to a potential which depends on the drop across this resistor. It will be seen that if the potential on conductor 129 is about 29 volts the potential on conductor 120 will be somewhat above 20 volts, in view of the relation between the resistance of resistor 125 and the resistance of resistor 121 and the remaining portion of the circuit.

The potential on conductor 129 is applied to the grid of tube 126 by way of resistor 122 and current flow in an obvious circuit through the tube causes a positive potential to appear on conductor 130. There is also a positive potential on conductor 131 due to current flow through tube 134. At the moment the potential on conductor 131 is the higher by a small amount which is sufficient, however, to cause substantially maximum deflection of the needle of the microammeter 87, Fig. 7, to the left, assuming that this is the direction in which the needle is deflected when a balance wheel being tested is too slow.

Other results of the closure of the main switch S may now be noted. At the galvanometer 83 current is supplied to the motor, which begins to run and drive the mechanism for periodically damping the galvanometer needle and testing its position. At this time the switch S1 in its upper position, in which the conductors leading to the galvanometer coil are grounded. The needle is not deflected, therefore, and no rotation of shaft 84 takes place.

Relay 91 energizes when the main switch is closed, over a circuit which is in parallel with the primary winding of transformer 97 and extends by way of resistor 152, rectifier 153, potentiometer 154, relay 91 and heater of tube 101 to ground. Current flow through the rectifier 153 is intermittent, of course, but the condenser 155, which may be an 80 mf. electrolytic condenser, maintains a fairly steady flow of current through relay 91 to maintain it energized.

The condenser 156 may also be an 80 mf. electrolytic condenser and functions to maintain the heater voltage constant. It is not effective for very low frequency voltage changes and is supplemented or aided by the battery 89 which is connected to the heater circuit by the energization of relay 91. The voltage at the junction 157 is adjusted by means of potentiometer 154 so that it is equal to the voltage of battery 89. When the battery is connected to the junction by operation of relay 91, therefore, it does not supply any current to the circuit, nor shunt any current from the heater, except for minute amounts which are sufficient to maintain the heater voltage constant. The battery eliminates the very low frequency changes in voltage to which commercial supply systems are subject, which are of no concern in the amplification of frequencies of say 25 cycles per second or higher because of the heat storage capacity of the cathodes of the amplifying tubes, but which in the present case, where the frequency of the voltage to be amplified is 2½ cycles per second, would seriously distort the output if not suppressed.

The relay 91 also connects the 90 volt battery 90 to the screen of the tube and to a point in the plate circuit, for the purpose of maintaining constant potentials at these points. The voltage regulator tubes 99 and 100 are provided in order to maintain constant voltage on conductor 142 and function as intended but are not entirely adequate to eliminate low frequency voltage changes such as may be due to the operation of relays 111 and 112.

The resistors 158 and 160 are so proportioned that when the circuit is in operation the voltage at junction 159 is substantially equal to the voltage of battery 90.

Having closed the main switch with results which have been pointed out, the operator may insert a balance wheel such as 15 in the stand and clamp the free end of the associated hairspring 16 between the rollers 30 and 31. As part of the latter operation the operator should see to it that the lower coil of the hairspring passes outside the pin 65 of the microphone 54, and she may also rotate the wheel 40 a few degrees with her thumb to make sure that the hairspring is properly seated in the groove in roller 30 so as to feed through when the roller is rotated.

The movement of the balance wheel during clamping of the hairspring may cause it to start oscillating but if not the operator starts it with a flick or her finger. During oscillation of the balance wheel the hairspring expands and contracts, thereby varying the pressure of the lower coil against the pin 65 of the microphone and generating a 2½ cycle alternating current in a circuit which includes the microphone, the switch 106, and the resistor 107. The voltage developed across resistor 107 is applied to the control grid of tube 101 through the resistor 108 and the biasing battery 109, which may be a 1.5 volt dry cell. The condenser 110 may have a capacity of about .05 microfarad and provides a low impedance path to ground for such high frequency components as may accidentally be present in the output of the microphone.

The plate circuit of tube 101 is coupled to the control grid of tube 102 by a circuit arrangement comprising a 2 microfarad condenser 161, the potentiometer 162, resistor 163, and biasing battery 165. The condenser 164 is a low capacity by-pass condenser for high frequency components and functions like condenser 110. The potentiometer 162 is a volume control device. After initial adjustment it will not ordinarily be used except when changing to balance wheel of a different size or type, which may give larger or smaller outputs.

The tube 101 operates as an amplifier of the weak 2½ cycle signal generated by the balance wheel and transmits a much more powerful signal to the tube 102, which also operates as an amplifier. The tube 101 is enabled to function in a satisfactory manner to amplify the extremely low frequency signal voltage because of the elaborate filtering circuits which are used and which have been described. These precautions are not needed at the second stage tube 102, in view of the much stronger signal imput. A filter condenser 166 may, however, be provided.

The output of tube 102 is transmitted to the control grid of tube 103 through the 2 microfarad coupling condenser 167 and the resistor 168. The output of tube 103 is transmitted to the control grid of tube 104 by way of the 2 microfarad coupling condenser 170 and the resistor 172. Condenser 173 is a phase correcting condenser which will be mentioned later. The tubes 103 and 104 operate to some extent as amplifiers but their main function is to convert the output of the second stage tube 102 from an approximate sine wave to a flat topped or square wave. The process is indeed started at the second stage where the resistor 163 in the grid circuit preferably has a value of 1 megohm. The resistors 168 and 172 in the grid circuits at the third and fourth stage tubes 103 and 104, respectively, preferably have resistances of 10 megohms each. These high resistances limit the grid currents in the tubes to extremely low values and prevent the grids from acquiring more than a very low positive potential from incoming signals, whereby the output of tube 104 has the desired wave shape, characterized by a substantially vertical wave front, or substantially instantaneous change from negative to positive and vice versa.

The plate circuit of tube 104 is coupled to the control grid of tube 105 by means of conductor 174 and resistor 175, Fig. 8. The voltage applied to the grid, therefore, is a varying positive voltage having a wave shape of the character described. The cathode of tube 105 is maintained at a positive potential of 150 volts and the plate resistor at tube 104 should have such value that the voltage range of the signal applies to the grid of tube 105 extends above and below the cathode potential. The tube thus becomes fully conductive instantaneously at the beginning of each positive half wave and cuts off at the beginning of each negative half wave.

Relays 111 and 112 are included in the plate circuit of tube 105 and energize each time the tube becomes conductive. The described arrangement for controlling the tube, including the means for converting the microphone output from a sine wave to a square wave, insures that the relays will be operated accurately in synchronism with the oscillation of the balance wheel.

Each time relay 111 energizes it attracts its armature 113 and closes a circuit for charging the condenser 114, which may have a capacity on the order of 2 microfarads. Each time the relay deenergizes, its armature is retracted, closing a circuit for discharging the condenser through the solenoid 81, Fig. 7, which operates the air pump 80. The impulses thus transmitted to the solenoid are effective to operate the air pump to generate impulses or puffs of air which are delivered to the balance wheel 15 through the pipe 74 and maintain the wheel in oscillation.

Figure 2:
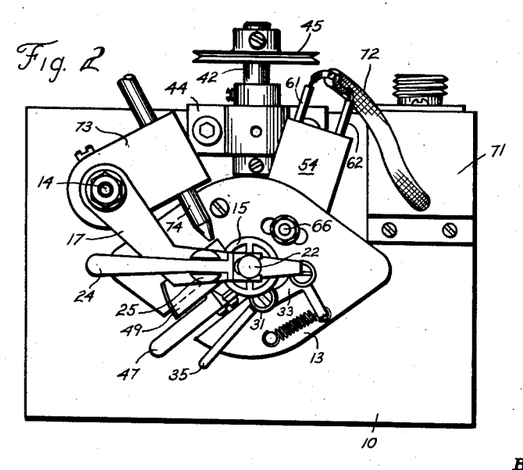
Fig. 2 is a top or plan view of the same.

It will be understood that the air impulses should be delivered to the wheel during alternate beats, when it is rotating in a counter-clockwise direction as seen in Fig. 2, and preferably at about the middle of each such beat, when the wheel has its greatest velocity.

As regards the first requirement, the described circuit arrangement causes the relay 111 to energize during positive half waves and deenergize during negative half waves. The half waves correspond to beats of the balance wheel and since air impulses are generated only responsive to deenergizations of the relay, the air impulse frequency is one half the beat frequency. That is, an air impulse is delivered to the wheel on every other beat. If it should be found, when the apparatus is first set up, that the air impulses are 180 degrees out of phase with the wheel the condition is corrected by reversing the connections to the crystal microphone terminals. Or the air nozzle could be shifted to drive the wheel in a clockwise direction.

As regards the second of the above mentioned requirements, the air impulses can be exactly timed with reference to the mid-points of the beats by means of a phase shifting or correcting condenser 173 inserted preferably in the imput circuit at the fourth amplifier stage. This condenser may be a variable condenser. A fixed condenser having a capacity of .005 microfarad has been used with good results in the specific apparatus described herein.

The function of relay 112 is to build up the potential on condenser 117 to a value which is proportionate to the rate of the balance wheel, and it accomplishes its function by charging and discharging the condenser 116 over the circuits shown. Explaining the operation more in detail, the condenser 117 preferably has a capacity of 1 microfarad while the condenser 116 is much smaller, having a capacity of .02 microfarad, for example. The condenser 117 charges to the potential of conductor 120 when the main switch is closed, as already described. Relay 112 being deenergized at this time, condenser 116 becomes charged over a circuit which extends from conductor 120 by way of rectifier tube 118, condenser 116, back contact 115, and resistor 177 to plus B conductor 142. This is the condition that exists prior to starting the wheel.

When the balance wheel starts oscillating, the relay 112 energizes and deenergizes responsive thereto, in the manner explained. Upon the first energization of the relay the condenser 116 is discharged over an obvious circuit which includes front contact 115 and the rectifier tube 119. Upon the following deenergization of the relay the condensers 117 and 116 charge in series over the circuit through rectifier tube 118, and the potential on conductor 120 is raised by a few volts. Upon the next energization of the relay, condenser 116 is discharged again, and the potential on conductor 120 starts to revert to its former value by discharge of condenser 117 through resistor 125. Before the latter operation can proceed very far the relay deenergizes again and the condenser 117 is given another increment of charge by way of its series connection with condenser 116. The repeated charging of condenser 117 in this manner raises its potential and the potential on conductor 120 quickly until an equilibrium condition is reached, when the rate of charge becomes equal to the rate of discharge. This condition is reached approximately after about 10 or 15 beats of the wheel when the voltage on conductor 120 will be in the neighborhood of 30 volts, for example.

The value of 30 volts is the approximate potential reached when testing 5 beat balance wheels with the apparatus as shown and described. It is within the voltage range for conductor 129 as determined by the adjustment of the potentiometers 139 and 140, and varies within this range in accordance with the rate of the balance wheel. Since the potential on conductor 151 (about 29 volts) is lower than 30 volts and the potential on conductor 150 (about 31 volts) is higher, no current can flow through tube 133 or 132 at this time and the voltage on conductor 129 is the same as that on conductor 120.

The value of 30 volts referred to for conductor 120 is the average value, and does not take into consideration the 2½ cycle ripple caused by the intermittent charging of condenser 117. The ripple is substantially eliminated at conductor 129 by the tube 128 in a manner which will be readily understood. When the voltage starts to rise, for example, a positive impulse is transmitted through condenser 124 to the grid of tube 128. This increases the current flow through the tube, the voltage at the plate of the tube falls and a negative impulse is transmitted to conductor 129 by way of condenser 123, thus counteracting the incipient rise in voltage which initiated the operation.

The voltage produced at conductor 129 by operation of relay 112 in the manner described appears also on the grid of tube 126 and causes a corresponding voltage to appear on conductor 130. It may be stated now that the potentiometer 136 is so adjusted that the voltage on conductor 131 is standard for 5 beat balance wheels, that is, it is equal to the voltage which is developed on conductor 130 by a balance wheel having the correct rate of oscillation. If the rate of the balance wheel 15 is correct, therefore, there will be no difference of potential between conductors 130 and 131. If the balance wheel is slow the voltage on conductor 130 will be lower than that on conductor 131 and will be higher if the balance wheel is too fast.

After the operator has started the wheel she changes switch S1 from its upper to its lower position, thereby connecting the galvanometer 83 in series with the microammeter 87. If the galvanometer needle is free, or as soon as it becomes free, it assumes a deflected position in accordance with the difference in the potentials on conductors 130 and 131. The switch having been changed over without any substantial delay after starting the wheel, the potential on conductor 129 probably will not have had time to build up fully, in which case the potential on conductor 130 will be lower than that on conductor 131 regardless of the rate of the wheel. The difference in potential will in fact be at a maximum value as determined by the lower limit of the potential on conductor 129 which in turn is determined by the adjustment of potentiometer 140.

The galvanometer apparatus 83 now operates to clamp the needle in deflected position, test its position, release the needle, and rotate the shaft 84 and pulley 86 by an amount proportionate to the amount by which the needle was deflected. Pulley 86 drives pulley 45 by means of belt 85, and pulley 45 rotates shaft 42 and the rest of the drive mechanism for roller 30 in an obvious manner. The direction of rotation is such that the effective length of the hairspring is reduced. This is all right because the hairsprings are purposely made too long and by clamping them near the end the operator can make sure that they will all test too slow, thus making it possible to switch on the galvanometer without delay each time and still avoid any danger that the first adjustment will be in the wrong direction.

The galvanometer apparatus operates about once every two seconds and during each interval between operations the needle is left free to assume a new position. When the second operation occurs the needle may still have the maximum deflection causing the hairspring to be shortened again by the maximum amount. The time required for two operations, however, is usually sufficient to allow the charge on condenser 117 to build up to a point where its value is indicative of the rate of the balance wheel, and since the hairspring has been shortened twice by the maximum amount, the rate of the balance wheel will have increased sufficiently to raise the voltage on conductor 129 above its minimum value. This may occur responsive to the first operation of the galvanometer, but will usually require two operations or even three, depending on how much the hairsprings are too long to start with, how much they are shortened at each operation, the time elapsed between starting the wheel and closing the switch, etc.

Succeeding operations of the galvanometer apparatus now increase the rate of the wheel by progressively smaller amounts, responsive to differences in the potentials on conductors 130 and 131 which become progressively smaller, until after a few adjustments the rate of the balance wheel is correct. At this time the voltage on conductor 130 will be equal to the voltage on conductor 131, the microammeter will read zero, and the needle of the galvanometer will be in zero or neutral position.

The operator may now restore switch S1 to its former position and then raise the lever 47 on the stand to mark the hairspring and cut off the excess length. After restoring lever 47, the lever 35 is moved to the right to disengage roller 31 from roller 30 and release the hairspring. The upper pivot bearing 22 may then be raised by means of lever 24 and the balance wheel can be removed from the stand.

The apparatus is now in condition to test and regulate another balance wheel in the manner described and the operation may be repeated as often as desired. During the interval after each wheel is removed and until a new wheel is inserted the microphone output falls to zero and the operation of relays 111 and 112 ceases. The relays resume operations each time when a new wheel is inserted in the stand and is set in motion by the operator.

It will be understood that in case the operator should clamp the hairspring too short, or so short that it becomes too short as a result of the operation of the galvanometer apparatus while the charge is building up on condenser 117, the rate of the balance wheel will be fast and the potential on conductor 130 will be higher than the potential on conductor 131. Under these conditions the galvanometer needle is deflected in the opposite direction from the direction in which it is deflected when the wheel is slow, and the adjustment of the hairspring is effective to lengthen rather than shorten it.

The galvanometer 83 and the microammeter 87 are sensitive instruments and give nearly full scale deflections responsive to a potential difference between conductors 130 and 131 which is only a fraction of a volt. It will be clear therefore that the instruments would be damaged were it not for the protective arrangement comprising the rectifier tubes 132 and 133 and the potentiometers 139 and 140, which limit the potential difference that can exist to a small value. For example, when there is no wheel in the stand the voltage on the condenser 117 falls off considerably but the potential on conductor 129 cannot drop very far due to current flow through the low resistance rectifier tube 133 over the circuit previously described, which maintains the potential at a value only slightly less than the potential on conductor 151, or about 29 volts. On the other hand if the voltage on the conductor 137 should drop due to accidental disturbance of potentiometer 136, or if tube 134 should be removed or become inoperative, the voltage on conductor 131 will still be maintained not far from the voltage on conductor 130, by current flow from ground by way of resistor 141, potentiometers 140 and 139, conductor 150 and rectifier tube 132 to conductor 129. The low resistance of tube 132 maintains conductor 150 and conductor 131 at a potential only slightly less than the potential on conductor 129, whatever it may be.

The circuit through tube 132 also guards against an excessive rise in potential on conductor 129 due to a fast wheel. Assuming that potentiometer 139 is adjusted so that the potential on conductor 150 is 31 volts, for example, if the potential on conductor 129 rises above this value, current will start to flow through tube 132, which ends to prevent any further rise.

The potentials of 31 volts and 29 volts have been mentioned as suitable for conductors 150 and 151, respectively, on the assumption that a balance wheel oscillating at the correct rate will produce a voltage of 30 volts on conductor 129. If the constants are changed so that a balance wheel having the correct rate gives a different voltage, say 28 volts, then the voltages on conductors 150 and 151 will be about 29 and 27 volts, respectively. The potentiometers 139 and 140 should be so adjusted that the voltages on conductors 150 and 151 define the limits of a range extending about equal distances above and below the voltage produced by a balance wheel the rate of which is correct.

The limits of the range should be close enough together so that the needle of the microammeter cannot go off the scale in either direction under any operating condition while leaving a definite region between the limits in which the voltage on conductor 129 is unaffected by current flow through either tube 132 or 133 and is entirely dependent upon the charge in condenser 117. The range can be checked by observing the microammeter while testing fast and slow balance wheels. Approximately full scale deflections should be obtained in both directions but the needle should not go off the scale in either direction. If either limit appears to be off, it can be corrected by adjusting the associated potentiometer 139 or 140 as the case may be.

In the foregoing explanation of the operation of the apparatus it has been assumed that the potentiometer 136 is correctly adjusted so that the voltage on conductor 137 (and on conductor 131) is correct or standard for the particular type of balance wheel being tested, so that a zero reading will be obtained when the rate of a wheel being tested is correct. The correct adjustment of potentiometer 136 may be obtained in several ways. If timed and regulated balance wheels are available, such as may have been regulated on equipment already in operation, one of these tested balance wheels may be inserted in the stand, Fig. 1, and the end of the hairspring may be clamped at the exact point it was clamped before. The balance wheel is then set in motion and the potentiometer 136 is adjusted until the microammeter reads zero.

It is preferable, however, to provide an accurate standard frequency source for each type or different rate wheel to be tested. For 5 beat balance wheels, for example, a standard frequency generator having an output frequency of 2½ cycles per second may be provided. This may be a pendulum actuated microphone or any suitable constant frequency generator having the desired frequency. The standard frequency generator may be connected temporarily to terminal 180, Fig. 7, and the switch 106 may be shifted to its alternate position in order to substitute the standard frequency source for the microphone 54. The generator is then started and the potentiometer 136 is adjusted until the reading of the microammeter is zero.

The potentiometer 136 should have a finely calibrated dial so that an accurate record may be made of the setting for 5 beat balance wheels, if this is the rate of the wheels to be tested. In case balance wheels having different rates are to be regulated, the correct adjustment of the potentiometer for each class of wheel may be determined in the manner explained and several potentiometer settings may be recorded or may be marked on the dial. The operator can then adapt the apparatus to testing any class of wheel by merely changing the setting of the potentiometer.

The invention having been described, that which is believed to be new and for which the protection of Letters Patent is desired will be pointed out in the appended claims.

We claim:

1. Apparatus for regulating the rate of a balance wheel and associated hairspring, comprising a stand, means included in the stand for supporting a balance wheel for oscillation, a pair of rollers for gripping the free end of the hairspring associated with said balance wheel, means for rotating one of said rollers to adjust the effective length of said hairspring, a crystal microphone, an actuating pin for said microphone, an operative connection between said pin and the crystal in said microphone adapted to cause electrical response of the crystal to a force acting on the pin in one direction which is perpendicular to the axis of the pin but not to a force acting on the pin in the same plane and in a direction at right angles to the direction of said first force, and means supporting said microphone on said stand with the side of the pin engaged by the coil of said hairspring adjacent said rollers and the microphone so oriented with reference to said pin that the change in pressure on said pin caused by expansion and contraction of said coil produces an electrical output from said microphone whereas the sliding contact between said coil and pin during adjustment of the hairspring does not.

2. Apparatus as claimed in claim 1, wherein the actuating pin of the microphone is continuously engaged by the hairspring during oscillation of the balance wheel and the output of the microphone has substantially the form of a sine wave.

3. Apparatus for regulating the rate of a balance wheel and hairspring, comprising means responsive to oscillation of the balance wheel for generating alternating current having a frequency depending on the beat frequency of the wheel, a condenser, means for converting said alternating current to impulses of direct current, means operable in response to said impulses to charge said condenser to a substantially constant voltage having a value dependent on the frequency of said alternating current, and means for comparing the condenser voltage with a standard voltage to determine if the balance wheel is fast or slow.

4. Apparatus as claimed in claim 3, including mechanism controlled by said comparing means and operable to change the effective length of the hairspring in accordance with the difference between said voltages while the balance wheel is oscillating.

5. Apparatus for regulating the rate of a balance wheel and hairspring, comprising means for driving the wheel, a condenser, means responsive to oscillation of said wheel at a rate which may be fast or slow for delivering successive increments of charge to said condenser, a circuit for continuously discharging the condenser, said circuit containing resistance, said resistance having a value such that a substantial part of each increment of charge delivered to said condenser is retained, whereby the charge on said condenser attains an equilibrium voltage dependent on the beat frequency of the wheel, and means for comparing said voltage with a standard voltage to determine if the balance wheel is fast or slow.

6. Apparatus as claimed in claim 5, wherein a second condenser of relatively low capacity is provided for measuring the increments of charge delivered to the first condenser, and wherein the means responsive to oscillation of the wheel includes charging and discharging circuits for the second condenser, one of said circuits including both condensers.

7. Apparatus as claimed in claim 5, wherein a circuit including the condenser is provided to maintain a minimum charge on the condenser to enable the equilibrium voltage to be attained quickly when the wheel starts oscillating.

8. In a timing apparatus, a relay, means for energizing and deenergizing said relay in synchronism with an oscillating balance wheel, a large capacity condenser, a small capacity condenser, circuits controlled by said relay for alternately charging said small condenser in series with the large condenser and discharging the small condenser, and a circuit containing resistance for discharging said large condenser during discharge of said small condenser, said resistance having a high value such that the large condenser is only partially discharged each time, whereby the large condenser attains a charge dependent upon the rate of the balance wheel.

9. Timing apparatus as claimed in claim 8, characterized by the provision of rectifiers in the charging and discharging circuits of the small condenser to limit current flow in said circuits to one direction only.

10. In a timing apparatus, a conductor, means responsive to oscillation of a balance wheel for establishing and maintaining a test voltage on said conductor which is proportionate to the rate of the wheel, a direct current circuit including resistance, said resistance having first and second adjustable taps having potentials which are higher and lower, respectively, than the said test voltage when the rate of the balance wheel is correct, and means for maintaining the voltage on said conductor within the range of said potentials, said last means comprising a connection including a rectifier poled to permit current flow from the high potential junction to said conductor, and a connection including a rectifier poled to permit current flow from said conductor to said low potential junction.

11. In a timing apparatus, a test conductor, means responsive to oscillation of a balance wheel for generating impulses in synchronism therewith, means responsive to said impulses for generating a test voltage on said conductor having a substantially constant value proportionate to the frequency of said impulses, an instrument for measuring the difference between said test voltage and a standard voltage, said instrument having a range which is substantially less than the difference between said standard voltage and zero voltage, and means operative when no impulses are being received for maintaining the voltage on said conductor at a minimum value sufficiently close to said standard voltage so that the difference between voltages is within the operative range of said instrument.

12. In a timing apparatus, two conductors, means for maintaining a standard voltage on the first of said conductors, means responsive to oscillation of a balance wheel for maintaining a test voltage on the second conductor which is higher or lower than the voltage on the first conductor depending on the rate of said wheel, a galvanometer connected to said conductors and adapted to give substantially full scale deflections responsive to potential differences in the range encountered in testing fast and slow wheels, and protective circuits for preventing the occurrence of substantially greater potential differences between said conductors, one said circuit comprising a unidirectional path for current flow from said second conductor in case its voltage should become less than the lower limit of said range and the other said circuit comprising a unidirectional path for current flow to said second conductor in case its voltage should become greater than the upper limit of said range.

13. In a timing apparatus, first and second conductors, means for maintaining a standard voltage on the first conductor, means responsive to oscillation of a balance wheel for producing a test voltage on the second conductor which is higher or lower than the standard voltage depending on whether the wheel is fast or slow, an instrument for detecting a difference between said voltages, and means for operating said instrument without affecting said voltages, comprising two space discharge devices having control grids connected to said conductors, respectively, and conductors extending from the cathodes of said devices to said instrument.

14. Apparatus for checking the rate of balance wheels, comprising means responsive to oscillation of a balance wheel for generating a substantially constant test voltage having a value which depends on the rate of the wheel, an instrument for comparing said test voltage with a standard voltage to determine if the wheel is fast or slow, means for generating said standard voltage, and means including a potentiometer connected in circuit with said last mentioned generating means for quickly changing the value of said standard voltage to adapt said apparatus for checking the rate of balance wheels having different beat frequencies.

15. In an apparatus for regulating the rate of a balance wheel and associated hairspring, a stand, means included in stand for supporting a balance wheel for oscillation, a pair of rollers for gripping the free end of the hairspring associated with said balance wheel, a crystal microphone, an actuating pin operatively connected to the crystal in said microphone to cause electrical response thereof when a force is applied to one side of the pin, and means for supporting said microphone on said stand with said pin extending parallel to the oscillation axis of the balance wheel and inside the outer coil of said hairspring adjacent said rollers, the distance between said axis and said pin being such that the side of the pin is substantially continuously engaged by said outer coil during oscillation of said balance wheel in both directions, whereby the change in pressure on said pin by expansion and contraction of said coil produces an alternating current output from said microphone.

16. In an apparatus for checking the rate of a balance wheel and associated hairspring, a stand, means included in said stand for supporting a balance wheel for oscillation, means for gripping the free end of said hairspring, a crystal microphone, an actuating member operatively connected to the crystal in said microphone, means for supporting said microphone on said stand with said member in contact with the outer coil of said hairspring at a point adjacent said gripping means, the distance between said member and the oscillation axis of said balance wheel being such that said contact is continuously maintained during oscillation of said balance wheel, and means for adjusting said distance to adapt the apparatus to balance wheels having hairsprings differing as to coil diameter.

17. In an apparatus for regulating the rate of a balance wheel and hairspring, means responsive to oscillation of the wheel for generating impulses having a frequency proportionate to the beat frequency of said wheel, means responsive to a plurality of said impulses, whether the rate of the wheel is correct or not, to generate and maintain a substantially constant voltage the value of which is determined by the frequency of said impulses, means for generating a standard voltage which corresponds in value to the voltage generated responsive to said impulses when the rate of the balance wheel is correct, an instrument for comparing the voltage generated responsive to said impulses with said standard voltage to determine if the rate of the balance wheel is fast or slow, and a circuit over which said voltages are applied to said instrument.

18. In an apparatus for regulating the rate of a balance wheel and hairspring, means responsive to oscillation of the wheel for generating impulses having a frequency proportionate to the beat frequency of said wheel, means responsive to a plurality of said impulses, whether the rate of the wheel is correct or not, to generate and maintain a substantially constant voltage the value of which is determined by the frequency of said impulses, means for generating a standard voltage which corresponds in value to the voltage generated responsive to said impulses when the rate of the balance wheel is correct, an instrument operated in accordance with the difference between the voltage generated responsive to said impulses and said standard voltage, and means controlled by said instrument for adjusting the length of said hairspring.

19. In an apparatus for regulating the rate of a balance wheel and hairspring, means responsive to oscillation of the wheel for generating impulses having a frequency proportionate to the beat frequency of said wheel, means responsive to a plurality of said impulses, whether the rate of the wheel is correct or not, to generate and maintain a substantially constant voltage the value of which is determined by the frequency of said impulses, means for generating a standard voltage which corresponds in value to the voltage generated responsive to said impulses when the rate of the balance wheel is correct, an instrument for testing the voltage generated responsive to said impulses to determine if the same is higher or lower than said standard voltage, and mechanism controlled by said instrument for adjusting the length of said hairspring in accordance with the result of such test.

20. In an apparatus for regulating the rate of a balance wheel and hairspring, means responsive to oscillation of the wheel for generating impulses having a frequency proportionate to the beat frequency of said wheel, means responsive to a plurality of said impulses, whether the rate of the wheel is correct or not, to generate and maintain a substantially constant voltage the value of which is determined by the frequency of said impulses, means for generating a standard voltage which corresponds in value to the voltage generated responsive to said impulses when the rate of the balance wheel is correct, an instrument for comparing the voltage generated responsive to said impulses with said standard voltage, and mechanism controlled by said instrument to change the effective length of said hairspring by an amount which depends on the difference between said voltages.

21. In an apparatus for regulating the rate of a balance wheel and hairspring, means responsive to oscillation of the wheel for generating impulses having a frequency proportionate to the beat frequency of said wheel, means responsive to a plurality of said impulses, whether the rate of the wheel is correct or not, to generate and maintain a substantially constant voltage the value of which is determined by the frequency of said impulses, means for generating a standard voltage which corresponds in value to the voltage generated responsive to said impulses when the rate of the balance wheel is correct, means operated periodically to test the voltage generated responsive to said impulses by comparing it with said standard voltage, and mechanism responsive to successive tests which show the rate of the balance wheel to be incorrect for changing the effective length of said hairspring by progressively smaller amounts.

22. In an apparatus for regulating the rate of a balance wheel and hairspring, the combination of means responsive to oscillation of the wheel for generating alternating current having a frequency proportionate to the beat frequency of the wheel, means for amplifying said alternating current and for converting the wave shape thereof to a substantially square wave, a space discharge device, means for applying potentials developed by the amplified and converted alternating current to the grid of said device, means for maintaining on the cathode of said device a potential which is intermediate the maximum and minimum potentials applied to the grid thereof, whereby said device is rendered alternately conductive and nonconductive, and a relay in the plate circuit of said device energized each time said device becomes conductive.

23. In an apparatus for regulating the rate of a balance wheel and hairspring, means for supporting a balance wheel for oscillation, means for gripping the free end of the hairspring associated with said wheel, variable pressure means operated by expansion and contraction of the outer coil of said hairspring during oscillation of said wheel to generate alternating current having a frequency equal to one-half the beat frequency of said wheel, an amplifier including a space discharge device having cathode, control grid, and plate, circuit means for deriving an alternating voltage from said alternating current and for applying said voltage to the control grid of said device, a heater circuit for the cathode of said device including a source of alternating current, a rectifier, a relay, and said heater, a condenser connected in parallel with a portion of said circuit which includes said relay, a condenser connected in parallel with said heater, a battery connected in parallel with said heater by energization of said relay, and a potentiometer for regulating the voltage delivered to said heater by said heater circuit to a value which is substantially equal to the voltage of said battery.

24. In an apparatus for regulating the rate of a balance wheel and hairspring, means responsive to oscillation of the wheel for generating alternating current having a frequency proportionate to the beat frequency of the wheel, means responsive to said alternating current for establishing and maintaining a substantially constant voltage having a value depending on the beat frequency of said wheel, means for generating and maintaining a standard voltage which is the same as said first mentioned voltage if the beat frequency of said wheel is correct, a circuit in which said voltages are opposed to each other, a device connected in said circuit and operable to compare the respective values of said voltages, and means including said device for changing the effective length of said hairspring in case said device detects a difference between said voltages.

25. In an apparatus for regulating the rate of a balance wheel and hairspring, means responsive to oscillation of the wheel for generating alternating current, means for converting said alternating current to impulses of direct current, a condenser, means actuated by said impulses for charging said condenser to a substantially constant test voltage which depends on the beat frequency of said wheel, means for generating a standard voltage of the same polarity as said test voltage and having a value corresponding to the correct beat frequency of said wheel, a device for comparing said voltages, circuit means for applying said voltages to said device in series opposition, and means controlled by said device responsive to a difference between said voltages for changing the effective length of said hairspring.

26. In an apparatus for regulating a balance wheel and hairspring, means responsive to oscillation of the wheel for generating a series of impulses having a frequency proportionate to the beat frequency of the wheel, a circuit including a resistor and a source of direct current, a condenser connected in shunt of said resistor, whereby said condenser is charged to a normal potential determined by the drop across said resistor, a circuit for connecting said condenser to said source over a path excluding said resistor, and means responsive to said impulses to periodically close said last mentioned circuit to thereby deliver successive increments of charge to said condenser to increase the potential thereof, said resistor being operative to discharge said condenser toward said normal potential after each increment of charge is received, whereby the potential on said condenser reaches an equilibrium value which depends on the frequency of said impulses.

27. Apparatus for regulating the rate of a balance wheel and hairspring, comprising means for driving the wheel, a condenser, a constant potential source, means responsive to oscillation of said wheel to periodically connect said source and condenser in series to thereby deliver increments of charge to said condenser, a circuit including a resistance for continuously discharging said condenser, whereby the charge thereon attains an equilibrium voltage dependent on the beat frequency of the wheel, a circuit including a source of current effective to maintain a minimum charge on said condenser to enable the equilibrium voltage to be attained quickly when the wheel starts oscillating, means for generating a standard voltage having a value corresponding to the correct beat frequency of said wheel, a device for comparing said voltages, and circuit means for applying said voltages to said device.

28. In an apparatus for regulating balance wheels with their associated hairsprings, means for supporting successive wheels for oscillation, rollers for gripping the free end of the hairspring of each wheel at a random point such that the rate of the wheel is slow by a variable amount, means for driving said wheels, means responsive to a plurality of oscillations of each wheel for establishing and maintaining a test voltage, the test voltage established by each wheel being substantially constant at a value which depends on the rate of the wheel, means for generating a standard voltage which is equal to the test voltage established by a wheel the rate of which is correct, a device for comparing the test voltages generated by said wheels with said standard voltage, and means controlled by said device responsive to each such comparison to operate said rollers to reduce the effective length of the hairspring gripped thereby.

29. Apparatus for regulating the rate of a balance wheel and hairspring, comprising pneumatic apparatus for driving said wheel by impulses of air, a microphone having an actuating pin, means supporting said wheel and microphone with said hairspring in continuous engagement with the said pin during oscillation of said wheel, thereby generating an alternating current having a wave shape approximating a sine wave and a frequency equal to one half the beat frequency of the wheel, a multi-stage vacuum tube amplifier for amplifying said alternating current, means in one or more amplifier stages preceding the final stage effectively converting the wave shape of said alternating current to a square wave which is applied to the control grid of the tube in the final amplifier stage, a relay in the anode circuit of said tube, means maintaining the cathode of said tube at a potential which is intermediate the maximum and minimum potentials of said square wave, thereby facilitating the positive operation of said relay at the beginning of each positive half wave and deenergization of the relay at the beginning of each negative half wave, a circuit controlled by said relay, and an electromagnet energized over said circuit to operate said pneumatic apparatus.

30. Apparatus as claimed in claim 29, including means for adjusting the phase relation between the alternating current generated by oscillation of the wheel and the square wave applied to the grid of the tube at the final amplifier stage, said means comprising an adjustable impedance element connected in the circuit coupling two adjacent stages of said amplifier.

31. Apparatus for generating a substantially constant voltage which is proportionate to the frequency of a given periodic voltage, comprising a condenser, a charging circuit for said condenser including a second condenser of smaller capacity and a source of fixed potential, a discharge circuit for said second condenser, means responsive to said periodic voltage to close said circuits alternately, whereby successive increments of charge are delivered to said first condenser, and a high resistance circuit over which the said first condenser, after its voltage has built up to a value indicative of the frequency of said periodic voltage, discharges at the same rate that it is being charged, whereby its voltage remains at said value.

32. In apparatus for regulating the rate of a balance wheel and hairspring, the combination of a support for a balance wheel having a hairspring to be regulated, adjusting means engageable with the free end portion of the hairspring of a balance wheel on said support and operable when actuated to change the effective length of the hairspring, means responsive to oscillations of the balance wheel on said support and operable to produce a unidirectional voltage having a value corresponding in amount and polarity to the difference between the frequency of the balance wheel and a standard frequency, and means responsive to said unidirectional voltage and operable to actuate said adjusting means and vary the effective length of said hairspring in a direction and in an amount corresponding to the value of said voltage to change the frequency of the balance wheel to the standard frequency.

33. In apparatus for regulating the rate of a balance wheel and hairspring, the combination of a support for a balance wheel having a hairspring to be regulated, an adjusting member engageable with the free end portion of the hairspring of a balance wheel on said support and movable relative to the spring to change the effective length thereof, means responsive to oscillations of the balance wheel on said support and operable to produce a voltage having a value corresponding to the difference between the frequency of the balance wheel and a standard frequency, and means controlling the movement of said adjusting member and operable in response to said voltage to move the member in a direction and by an amount corresponding to the value of the voltage to adjust the effective length of said hairspring and change the frequency of the balance wheel to the standard frequency.

THOMAS B. GIBBS.
PARKER B. WICKHAM.

References Cited in the file of this patent

UNITED STATES PATENTS

| Number | Name | Date |
|---|---|---|
| 1,967,072 | Young | July 17, 1934 |
| 2,019,769 | Poole | Nov. 5, 1935 |
| 2,231,849 | Gibbs | Feb. 11, 1941 |
| 2,286,907 | Gibbs | June 16, 1942 |
| 2,395,575 | Mitchell | Feb. 26, 1946 |
| 2,490,010 | Wild | Nov. 29, 1949 |
| 2,495,795 | Weston | Jan. 31, 1950 |
| 2,505,368 | Shenk et al. | Apr. 25, 1950 |
| 2,522,139 | Schoenbaum | Sept. 12, 1950 |